(12) United States Patent
Santana et al.

(10) Patent No.: US 12,449,317 B2
(45) Date of Patent: Oct. 21, 2025

(54) ADAPTABLE COOKING APPLIANCE CIRCUITRY FOR CONTROLLING COOKING ACCESSORIES

(71) Applicant: Haier US Appliance Solutions, Inc., Wilmington, DE (US)

(72) Inventors: Omar Santana, Louisville, KY (US); James Lee Armstrong, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 341 days.

(21) Appl. No.: 18/159,892

(22) Filed: Jan. 26, 2023

(65) Prior Publication Data

US 2024/0255361 A1  Aug. 1, 2024

(51) Int. Cl.
*G01K 15/00* (2006.01)
*A23L 5/10* (2016.01)
(Continued)

(52) U.S. Cl.
CPC ............ *G01K 15/007* (2013.01); *A23L 5/15* (2016.08); *A47J 36/32* (2013.01); *A47J 37/0629* (2013.01); *G01K 2207/02* (2013.01)

(58) Field of Classification Search
CPC .... G01K 15/007; G01K 2207/02; A23L 5/15; A47J 36/32; A47J 37/0629
(Continued)

(56) References Cited

U.S. PATENT DOCUMENTS

| | | | |
|---|---|---|---|
| 4,481,596 A | * | 11/1984 | Townzen ............ G01K 7/021 |
| | | | 374/E7.016 |
| 5,859,522 A | | 1/1999 | Theobald |

(Continued)

FOREIGN PATENT DOCUMENTS

| | | | | |
|---|---|---|---|---|
| CN | 201727388 U | * | 2/2011 | |
| CN | 111366262 A | * | 7/2020 | ........... G01N 27/048 |
| EP | 2639511 A2 | | 9/2013 | |

OTHER PUBLICATIONS

256-Positon I2C®-Compatible Digital Potentiometer, Analog Devices, Inc., https://www.mouser.com/datasheet/2/609/AD5245-1601824.pdf, accessed Jan. 24, 2023, 16 pages.

*Primary Examiner* — Eric S Stapleton
*Assistant Examiner* — Yeong Juen Thong
(74) *Attorney, Agent, or Firm* — Dority & Manning, P.A.

(57) ABSTRACT

A cooking appliance assembly includes a cooking appliance including a heat source and a port including a socket; at least one cooking accessory including an accessory sensor, a plug, and a resistive element, the plug being removably received within the socket; a variable resistance module provided within the cooking appliance and operably connected with the port; and a controller communicatively coupled with the cooking appliance and the at least one cooking accessory, the controller configured to perform an operation. The operation includes determining an accessory type of the cooking accessory engaged with the port of the cooking appliance; adjusting, via the variable resistance module, a reference resistance at the variable resistance module based on the determined accessory type; and selecting a corresponding temperature table or equation based on the determined type of the cooking accessory.

10 Claims, 5 Drawing Sheets

(51) Int. Cl.
*A47J 36/32* (2006.01)
*A47J 37/06* (2006.01)

(58) Field of Classification Search
USPC .................................. 99/342, 343, 344, 345
See application file for complete search history.

(56) References Cited

U.S. PATENT DOCUMENTS

| | | |
|---|---|---|
| 7,641,390 B2 | 1/2010 | Shidemantle et al. |
| 9,291,656 B2 | 3/2016 | Green |
| 10,521,372 B2 | 12/2019 | Kyoung-Hoon |
| 10,524,614 B2 | 1/2020 | Gregory et al. |
| 2004/0165646 A1 | 8/2004 | Shidemantle et al. |
| 2013/0049487 A1* | 2/2013 | Lanni .................. H02J 7/00036 307/151 |
| 2022/0082265 A1 | 3/2022 | Armstrong et al. |

* cited by examiner

ADAPTABLE COOKING APPLIANCE CIRCUITRY FOR CONTROLLING COOKING ACCESSORIES

FIELD OF THE INVENTION

The present subject matter relates generally to cooking appliances, and more particularly to an oven appliance having an adaptable port.

BACKGROUND OF THE INVENTION

Conventional residential and commercial oven appliances generally include a cabinet that defines a cooking chamber for receipt of food items for cooking. Heating elements are positioned within the cooking chamber to provide heat to food items located therein. The heating elements can include, for example, radiant heating elements, such as a bake heating assembly positioned at a bottom of the cooking chamber and/or a broil heating assembly positioned at a top of the cooking chamber.

When cooking certain food items, it may be important to check or monitor the temperature within the cooking chamber, as well as the temperature of the food item or cooking accessory, e.g., in order to ensure the food item is adequately cooked. As such, certain oven appliances include a temperature sensor for sensing the temperature within the cooking chamber. For example, the temperature sensor can be a resistance temperature detector (RTD), thermistor, or thermocouple located within a conductive sheath that extends into the cooking chamber. The temperature sensor may be positioned directly in the food item or may be connected to the cooking accessory used to perform a unique cooking operation. Changes in resistance through the temperature sensor may be utilized to determine temperature changes of the food item or cooking accessory via an algorithm or equation including a fixed resistance. However, some cooking accessories require different fixed resistance values in order to optimize a temperature reading.

Accordingly, an oven appliance assembly that obviates one or more of the above-mentioned drawbacks would be desirable. In particular, an oven appliance assembly capable of adjusting a temperature curve with respect to a resistance or voltage input would be useful.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a cooking appliance assembly is provided. The cooking appliance assembly may include a cooking appliance. The cooking appliance may include a heat source and a port comprising a socket. The assembly may further include at least one cooking accessory including an accessory sensor, a plug, and at least one resistive element, the plug being removably received within the socket; a variable resistance module provided within the cooking appliance and operably connected with the port; and a controller communicatively coupled with the cooking appliance and the at least one cooking accessory, the controller configured to perform an operation. The operation may include determining an accessory type of the cooking accessory engaged with the port of the cooking appliance; adjusting, via the variable resistance module, a reference resistance at the variable resistance module based on the determined accessory type; and selecting a corresponding temperature table or equation based on the determined accessory type of the cooking accessory.

In another exemplary aspect of the present disclosure, a method of operating a cooking appliance is provided. The cooking appliance may include a port defining a socket and a digital potentiometer operably connected with the port. The method may include receiving a plug of a cooking accessory within the socket, the cooking accessory including an accessory sensor, the plug, and at least one resistive element; identifying, via a controller provided within the cooking appliance, the cooking accessory; setting a reference resistance value within the digital potentiometer in response to identifying the cooking accessory; and selecting a corresponding temperature table or equation for a cooking cycle based on the identified cooking accessory.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
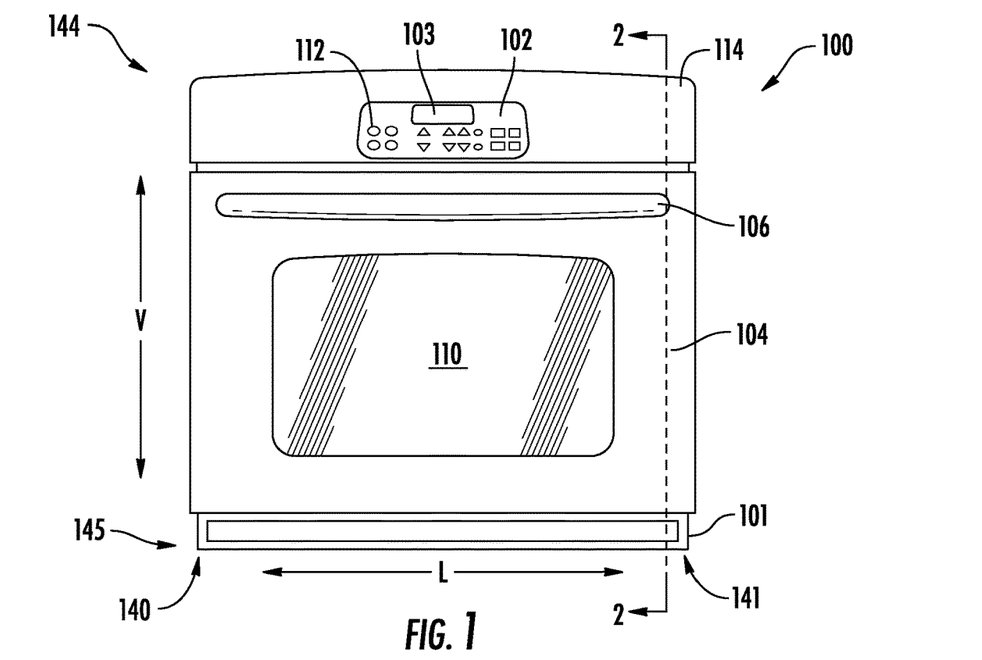
FIG. 1 provides a front view of an oven appliance according to an exemplary embodiment of the present subject matter.
Figure 2:
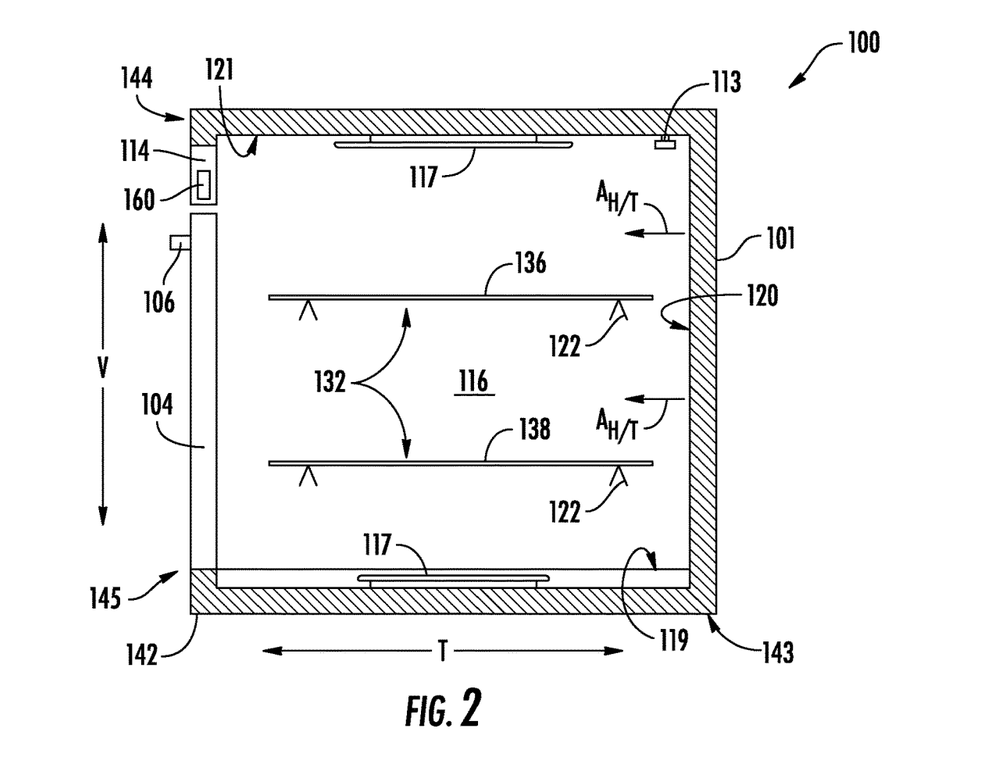
FIG. 2 provides a cross-sectional view of the oven appliance taken along the 2-2 axis of FIG. 1.

Referring to FIGS. 1 and 2, an exemplary embodiment of an oven (or cooking) appliance 100 for providing (e.g., convection or microwave) heating is shown according to the present disclosure. Although the cooking appliance shown and described herein is an oven appliance, it should be noted that the disclosure may apply to any appliance suitable for performing a cooking operation, including a microwave, a cooktop, a pizza oven, counter-top appliances, a griddle, or the like. In particular, FIG. 1 provides a front view of oven appliance 100. FIG. 2 provides a cross-sectional view of oven appliance 100 taken along the 2-2 axis shown in FIG. 1. Oven appliance 100 may include a cabinet or housing 101 with a cooking chamber 116 positioned therein.

Cabinet 101 extends between a first side 140 (FIG. 1) and a second side 141 (FIG. 1) along a lateral direction L. Further, cabinet 101 also extends between a front 142 (FIG. 2) and a back 143 (FIG. 2) along a transverse direction T. Cabinet 101 further extends between a top 144 and a bottom 145 along a vertical direction V. Transverse direction T is substantially perpendicular to lateral and vertical directions L, V. Thus, vertical direction V, lateral direction L, and transverse direction T are orthogonally oriented such that vertical direction V, lateral direction L, and transverse direction T form an orthogonal directional system.

Moreover, chamber 116 has interior walls including opposing sidewalls 118, bottom wall 119, back wall 120, and top wall 121 that define cooking chamber 116. Bottom wall 119 and top wall 121 are spaced apart along the vertical direction V, and sidewalls 118 extend along the vertical direction V between top wall 121 and bottom wall 119. Back wall 120 extends between sidewalls 118 along the lateral direction L and also extends between top wall 121 and bottom wall 119 along the vertical direction V.

Sidewalls 118 may include supports 122 (FIG. 2) for supporting oven racks 132 (FIG. 2) that may be selectively positioned within chamber 116. Oven racks 132 may include a top rack 136 and a bottom rack 138. Top rack 136 is positioned above bottom rack 138 along the vertical direction V.

Oven appliance 100 may also include a door 104 with a handle 106 that provides for opening and closing access to a cooking chamber 116. A user of oven appliance 100 can place a variety of different items to be cooked in chamber 116 onto racks 132. Heating elements 117 may be positioned at the top and the bottom of chamber 116 to provide heat for cooking and cleaning. Such heating element(s) can be e.g., gas, electric, microwave, or a combination thereof. Other heating elements (not shown) could be located at other locations as well. A window 110 on door 104 allows the user to view e.g., food items during the cooking process.

In another embodiment, oven appliance 100 may be equipped with features for selectively generating a forced flow of heated air within the cooking chamber 116 (e.g., using a fan or multiple fans). Thus, the oven appliance 100 is generally referred to as a convection oven. Such a flow of heated air can, e.g., decrease the required cooking temperature for food items, decrease the amount of time needed to cook food items, or assist in cooking food items more evenly.

Referring to FIG. 1, oven appliance 100 may include a user interface 102 having a display 103 positioned on top panel 114 with a variety of controls 112. In certain embodiments, user interface 102 allows the user to select various options for the operation of oven appliance 100 including e.g., temperature, time, and/or various cooking and cleaning cycles. Operation of oven appliance 100 may be regulated by a controller 160 (FIG. 2) that is operatively coupled i.e., in communication with, user interface panel 102, heating element(s), and other components of oven appliance 100 as will be further described.

For example, in response to user manipulation of user interface panel 102, controller 160 may operate heating element(s). Controller 160 may receive measurements from a temperature sensor 113 (FIG. 2) placed in cooking chamber 116 and e.g., provide a temperature indication to the user with display 103. Additionally or alternatively, as will be described in more detail below, cabinet 101 may include one or more accessory ports into which oven accessories may be plugged (e.g., via a plug). By way of example, controller 160 may include a memory and one or more processing devices such as microprocessors, CPUs, or the like, such as general or special purpose microprocessors operable to execute programming instructions or micro-control code associated with operation of appliance 100. The memory may represent random access memory such as DRAM, or read only memory such as ROM or FLASH. In one exemplary embodiment, the processor executes programming instructions stored in memory. The memory may be a separate component from the processor or may be included onboard within the processor.

Controller 160 may be positioned in a variety of locations throughout appliance 100. Thus, controller 160 may be located under or next to the user interface 102 or otherwise within top panel 114. In an exemplary embodiment, input/output ("I/O") signals are routed between controller 160 and various operational components of appliance 100 such as heating element(s), controls 112, display 103, sensor(s), alarms, and/or other components as may be provided. In one exemplary embodiment, user interface 102 may represent a general purpose I/O ("GPIO") device or functional block.

Although shown with touch type controls 112, it should be understood that controls 112 and the configuration of the oven appliance 100 shown in FIG. 1 is provided by way of example only. More specifically, user interface 102 may include various input components, such as one or more of a variety of electrical, mechanical, or electro-mechanical input devices including rotary dials, push buttons, and touch pads. User interface 102 may include other display components, such as a digital or analog display device designed to provide operational feedback to a user. User interface 102 may be in communication with the controller 160 via one or more signal lines or shared communication busses. Also, oven appliance 100 is shown as a wall oven but the present invention could also be used with other appliances such as e.g., a stand-alone oven, an oven with a stove-top, and other configurations as well.

Figure 3:
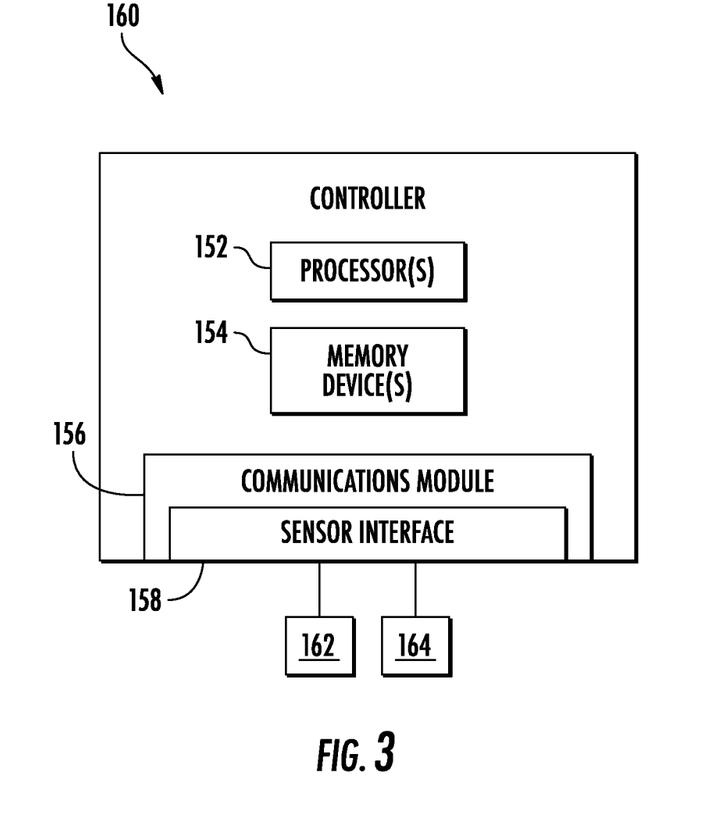
FIG. 3 provides a block diagram of one embodiment of a controller of an oven appliance according to the present disclosure.

By way of example, as shown in FIG. 3, there is illustrated a block diagram of one embodiment of various components of controller 160 according to the present disclosure. As shown (and described briefly above), controller 160 may include one or more processors 152 and associated memory devices 154 configured to perform a variety of computer-implemented functions (e.g., such as executing programming instructions or micro-control code associated with an operating cycle). In one embodiment, processors 152 execute programming instructions stored in memory devices 154. Memory devices 154 may be separate components from processors 152 or may be included onboard within processors 152. Memory devices 154 may store information accessible to processing devices 152, including instructions that can be executed by processing devices 152. Optionally, the instructions can be software or any set of instructions that, when executed by processing devices 152, cause processing devices 152 to perform operations. For certain embodiments, the instructions include a software package configured to operate oven appliance 100 and interpret one or more electrical signals. For example, the instructions may include a software package configured to execute commands based on feedback from a probe as described more fully below.

Additionally or alternatively, controller 160 may also include a communications module 156 to facilitate communications between controller 160 and the various components of oven appliance 100. Further, communications module 156 may include a sensor interface 158 (e.g., one or more voltage divider circuits) to permit signals transmitted from the various components of oven appliance 100, (e.g., via one or more sensors 162, 164), to be converted into signals that can be understood and processed by controller 160. It should be appreciated that the sensors 162, 164 may be communicatively coupled to communications module 156 using any suitable means. For example, as shown, sensors 162, 164 are coupled to sensor interface 158 via a wired connection. However, in other embodiments, sensors 162, 164 may be coupled to sensor interface 158 via a wireless connection, such as by using any suitable wireless communications protocol known in the art.

Furthermore, controller 160 may be positioned in a variety of locations throughout oven appliance 100. As illustrated, controller 160 may be located within user interface 102 of oven appliance 100 as shown in FIGS. 1 and 2. In such embodiments, input/output ("I/O") signals may be routed between controller 160 and various operational components of oven appliance 100, such as heating elements 117, controls 112, display 103, sensors, alarms, antennas, and/or other components as may be provided. For instance, signals may be directed along one or more wiring harnesses that may be routed through cabinet 101.

Figure 4:
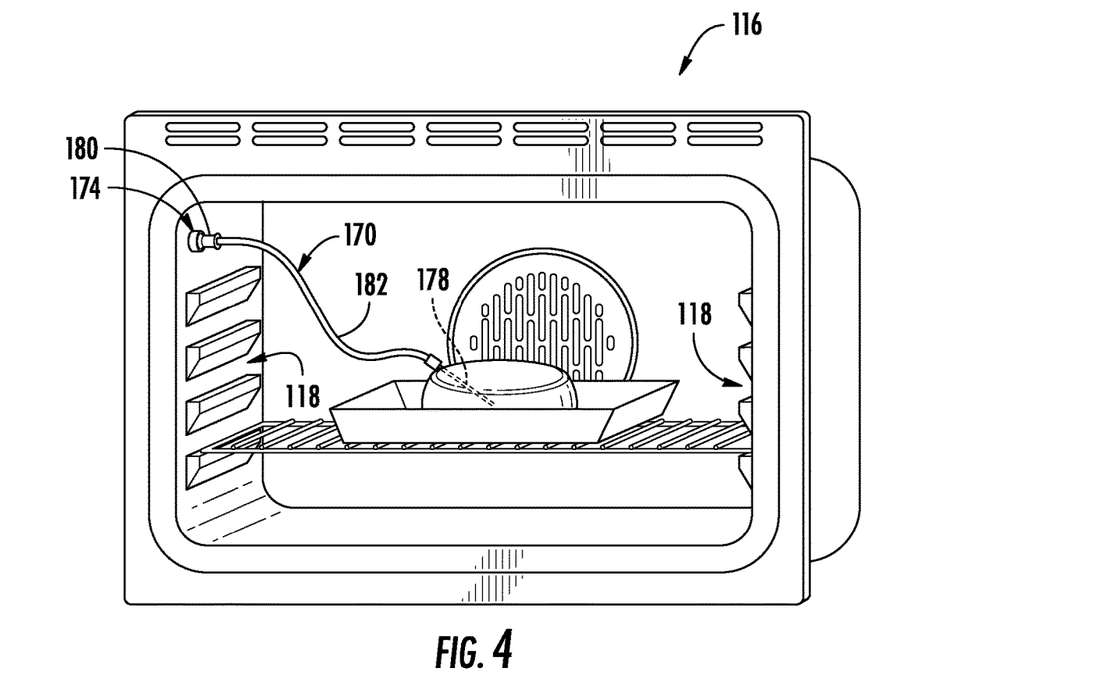
FIG. 4 provides a front, perspective view of one embodiment of an oven appliance having an adaptable port according to the present disclosure.
Figure 5:
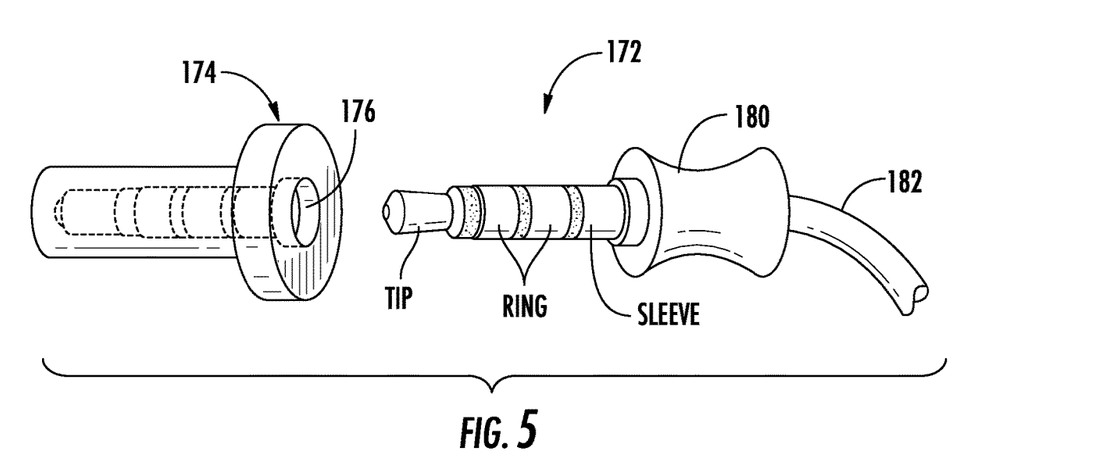
FIG. 5 provides an exploded, perspective view of one embodiment of a plug of an oven accessory being inserted into a port of the oven appliance 100.

Referring now to FIGS. 4 and 5, various views of oven appliance 100 of FIGS. 1 and 2 according to an exemplary embodiment of the present disclosure are illustrated. In particular, FIG. 4 provides a front, perspective view of cooking chamber 116 and FIG. 5 provides an exploded, perspective view of one embodiment of a plug 172 of an oven accessory 170 being inserted into a port 174 of oven appliance 100.

Referring particularly to FIG. 4, oven appliance 100 may include a port 174 having a socket 176. For example, in an embodiment, socket 176 may have a tip-ring-ring-sleeve (TRRS) configuration, a tip-ring-sleeve (TRS), or any other suitable configuration (e.g., any suitable number of rings). As used herein, and as particularly shown in FIG. 7, a TRRS socket or TRRS configuration generally encompasses a plug or connector having four conductors or poles (e.g., the tip, two rings, and the sleeve). Similarly, as used herein, TRS socket or TRS configuration generally encompasses a plug or connector having three conductors or poles (e.g., the tip, a ring, and the sleeve).

Figure 6:
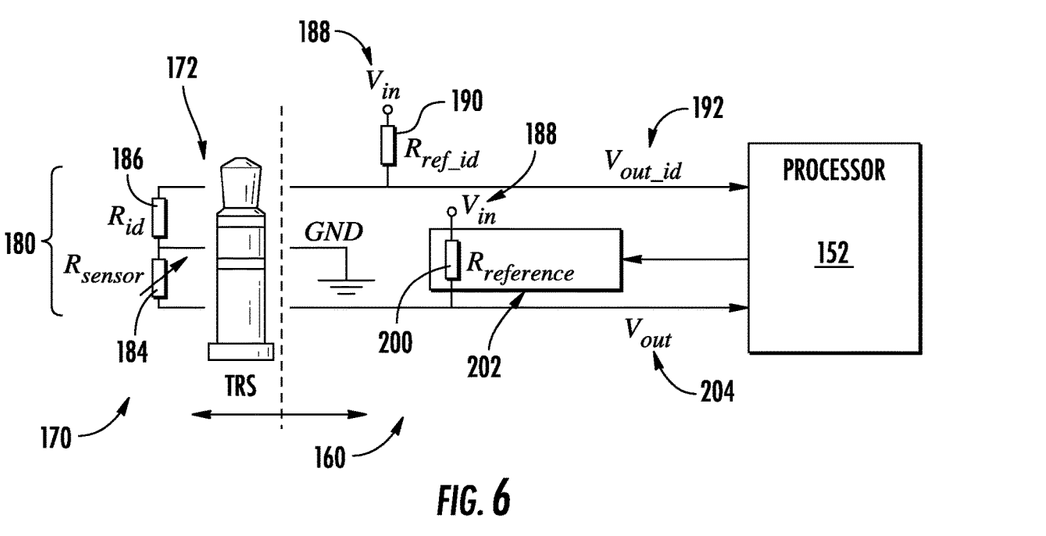
FIG. 6 provides a schematic view of an electrical connection of an oven accessory plug and oven appliance port of FIG. 5 according to an exemplary embodiment.

Accordingly, oven appliance 100 may be compatible with a plurality of different types of oven accessories 170. In particular, as shown in FIGS. 4 through 6, each of the oven accessories 170 may include a probe 178 and a plug 172. In addition, as shown in FIG. 5, each oven accessory 170 may also include at least one resistive element 180 adjacent to plug 172.

In the illustrated embodiment, as an example, plug 172 may have a unique TRRS configuration for engagement with socket 176 of port 174. Thus, in such embodiments, the TRRS socket 176 of oven appliance 100 can detect a sensor between the sleeve and one ring and may also read an identifying high temperature resistance value between the other ring and the tip. Additionally or alternatively, the TRRS socket 176 of oven appliance 100 can detect a sensor between the tip and the sleeve and may also read an identifying high temperature resistance value between the two rings. It should further be noted that the configuration of socket 176 (and plug 172) is not limited to the examples given herein, and that any suitable configuration may be used. In addition, as an example, resistive elements 180 described herein may include any suitable element, such as a resistor. In particular embodiments, for example, resistive elements 180 may include one or more film resistors. As such, resistive elements 180 described herein may be high temperature resistors (e.g., resistant to damage at temperatures greater than 275 degrees Celsius (C)), having a large resistance range (e.g., from about 20 ohms up to about 30 megohms), with very tight circuit resistance tolerances (e.g., as tight as 0.10%), and power ratings up to 22 Watts at 25° C. derates to zero at 275° C.

Accordingly, controller 160 may be communicatively coupled (e.g., in operative communication) with oven appliance 100 for determining a type of oven accessory 170 being used when a respective plug 172 is engaged with port 174 based on a resistance value of at least one of the resistive elements 180 of oven accessory 170 (e.g., identification resistor 186). Such oven accessories may include, for example, a food probe (such as a meat probe), a pan/dish/stone probe, a coffee roaster probe, or similar. Since each oven accessory 170 has a unique resistor value that identifies what type of accessory it is, controller 160 may select an appropriate cooking cycle to use with the particular type of oven accessory 170. In particular, probe 178 of oven accessory 170 may include at least one temperature sensor (e.g., thermocouple, thermistor, etc.) for measuring a temperature of a food item or associated pan during the cooking cycle. Additionally or alternatively, controller 160 may adapt the oven circuitry or select a temperature table (e.g., look up table) or equation used to determine the temperature of the item (e.g., food item, cooking accessory, etc.). As such, the temperature sensors may include a food temperature sensor, a pan temperature sensor, a stone temperature sensor, a dish temperature sensor, a coffee roaster temperature sensor, or any other suitable temperature sensor now known or later developed in the art.

Furthermore, as depicted particularly in FIG. 4, probe 178 of oven accessory 170 may be configured to be inserted into a food item or utensil (e.g., pan, dish, stone, etc.) placed within cooking chamber 116 and is configured to send signals to and receive signals from controller 160. Thus, to send and receive signals, probe 178 may include a transmission device and a receiving device (not shown) for communication with controller 160. In some embodiments, probe 178 may include a transceiver device that combines transmitting and receiving functionality. More specifically, as shown, probe 178 may be communicatively coupled with controller 160 via a transmission cable 182, which also communicatively couples respective probes 178 with the respective plugs 172. In addition, probe 178 may send signals indicative of the internal temperature of the food item in which probe 178 is inserted to controller 160 such that the signal may be interpreted by controller 160. In this way, oven appliance 100 may communicate the temperature of the food item to a consumer (e.g., by displaying the temperature on display 103).

In another embodiment, memory devices 154 described herein may have at least one of a table or equation stored therein. For example, the table may be a look up table. The look up table may be specific for each individual oven accessory. This table may allow, for example, conversion of the signal from a digital value to a temperature value. The digital value may be an output of the analog-to-digital converter. The value of the analog input to the analog-to-digital converter (e.g., a voltage value) may be determined in part by the value of the sensor resistor ($R_{sensor}$) 184 shown in FIGS. 6 and 7. This resistor value may thus be temperature-dependent. In certain embodiments, the table and/or equation may be downloaded and/or stored into memory devices 154 of controller 160 at any time. Advantageously, users may be permitted to upgrade their oven appliance 100 (e.g., with new look up tables) data over time as new oven accessories are developed.

Figure 7:
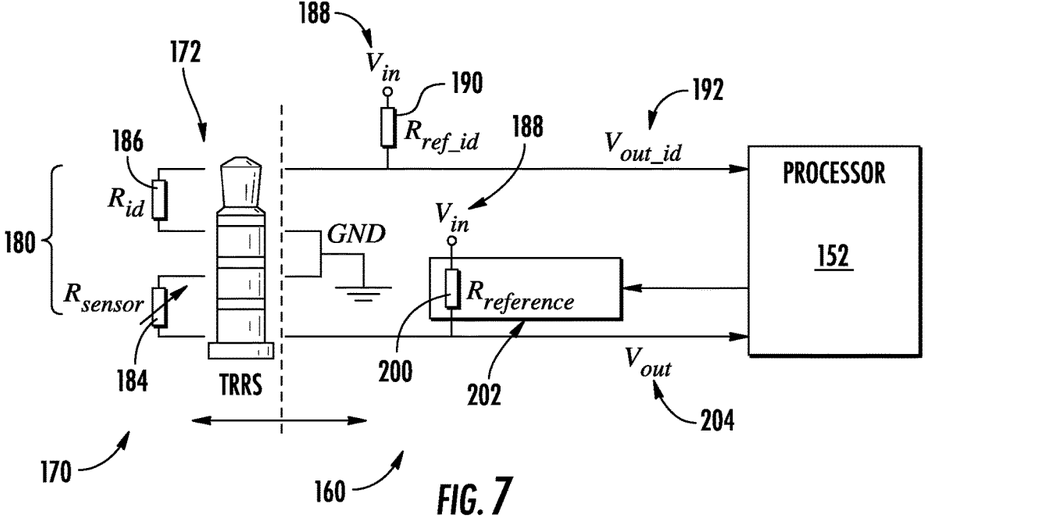
FIG. 7 provides a schematic view of an electrical connection of an oven accessory plug and oven appliance port of FIG. 5 according to another exemplary embodiment.

As disclosed herein, socket 176 may be electrically connected with controller 160. Accordingly, one or more circuits (or associated circuitry) may be provided within oven appliance 100 (e.g., within socket 176) through which electrical signals and information may be transmitted from plug 172 to controller 160. FIGS. 6 and 7 provide schematic representations according to embodiments of the disclosure. As will be described, controller 160 may identify an attached oven accessory 170 and provide a corresponding reference resistance to ensure accurate readings (e.g., temperature readings from probe 178) during a cooking operation.

A voltage divider circuit may be provided within oven appliance 100. The voltage divider circuit may receive a temperature-dependent resistance (e.g., from plug 172) which may be computed into a temperature of the food or cookware item provided in the cooking chamber. For instance, a reference resistance (described below) may be incorporated into the voltage divider circuit. The reference resistance may provide a calibrated and optimized sensing range (e.g., voltage range) of an output voltage. When a constant input voltage is applied through a variable sensing resistance (e.g., as dictated by a sensed temperature) and the reference resistance, the detected output voltage may indicate a temperature change. As would be understood, a higher resolution of detected or determined voltage change would lead to more accurate temperature sensing, including temperature changes, thus resulting in more accurate cooking operations.

According to the embodiment shown in FIG. 6, plug 172 has a TRS formation (e.g., a tip, one ring, and a sleeve). Optionally, as shown in the embodiment of FIG. 7, a TRRS formation (e.g., a tip, two rings, and a sleeve) may be used. It should be understood that any suitable formation of plug 172 may be utilized and the disclosure is not limited to the examples given herein. Accordingly, the description that follows may apply to any suitable plug 172 formation. Two different resistance values may thus be present through plug 172. For instance, a sensor resistor ($R_{sensor}$) 184 and an identification resistor (Rid) 186 may be provided on plug 172. As shown, sensor resistor 184 may be connected between the sleeve and the ring of plug 172, while identification resistor 186 is connected between the ring and the tip of plug 172. However, it should be understood that the specific orientation and placement of each of the resistors (or resistive elements) may vary according to specific embodiments. For instance, sensor resistor 184 may be connected between the tip and the ring while identification resistor 186 is connected between the ring and the sleeve. Additionally or alternatively, identification resistor 186 may be connected between the tip and a first (or distal) ring, while sensor resistor 184 is connected between a second ring (or proximal ring) and the sleeve.

A voltage input (Vin) 188 may be provided (e.g., within oven appliance 100). Additionally or alternatively, an input resistor ($R_{ref\_id}$) 190 may be provided adjacent to voltage input 188. Each of voltage input 188 and input resistor 190 may be predefined constants. For one example, voltage input 188 may be determined according to a positive power supply input (e.g., within oven appliance 100). According to some embodiments, oven appliance 100 (e.g., controller 160) may determine an accessory type of oven accessory 170 via the input resistor 190, the input voltage 188, the identification resistor 186 (on plug 172), and an identifying output voltage ($V_{out\_id}$) 192 (e.g., provided to processor 152). For instance, a value of the identification resistor 186 may be determined according to the following equation:

$$R_{id} = V_{out\_id} * \frac{R_{ref\_id}}{(V_{in} - V_{out\_id})}$$

Thus, a value of the identification resistor 186 (e.g., in Ohms) may be determined according to a value of the identifying output voltage 192. According to examples given herein, identifying output voltage 192 is used merely to determine the value of identification resistor 186. Upon determining the value of the identification resistor 186, controller 160 may determine the type of oven accessory 170 that is connected to oven appliance 100. For instance, controller 160 may include one or more tables (e.g., look up tables) associating the value of identification resistor 186 with a specific oven accessory, as provided by way of example below:

| $R_{id}$ (Ohms) | Oven Accessory |
|---|---|
| 1000 | Meat Probe |
| 2000 | Pizza Stone Probe |
| 3000 | Cake Dish Probe |
| 4000 | Casserole Dish Probe |
| 5000 | Coffee Roaster Probe |

Accordingly, an identification resistor 186 value of 1000 Ohms may signal a meat probe as the connected oven accessory 170, an identification resistor 186 value of 2000 Ohms may signal a pizza stone probe as the connected oven accessory 170, and the like. Additionally or alternatively, controller 160 may associate the identification resistor 186 value directly with a reference resistor value.

As mentioned above, the voltage divider circuit may include a reference resistor ($R_{reference}$) 200. Reference resistor 200 may be variable according to the determined oven accessory 170 type. In detail, reference resistor 200 may be changed via a variable resistance module (or variable resistor) 202. The variable resistance module 202 may adjust or set a resistance within the voltage divider circuit via software. In at least one example, the variable resistance module 202 is a digital potentiometer. Accordingly, reference resistor 200 may be adjusted within variable resistance module 202 according to the value of the identification resistor 186.

As seen in FIG. 6, for example, variable resistance module 202 may be connected between controller 160 (e.g., processor 152) and voltage input 188. Other circuit configurations may be used, including alternative locations of variable resistance module 202, and the disclosure is not limited to examples described herein. Variable resistance module 202 may thus selectively change a resistance value between input voltage 188 and processor 152. In turn, adjustments of reference resistor 200 may alter an output voltage 204 ($V_{out}$) observed at processor 152 (explained in more detail below). Advantageously, a variable resolution may be set within controller 160 according to the connected oven accessory 170 and accuracy of temperature readings may be facilitated or ensured.

As mentioned above, a value of identification resistor 186 may indicate a value of reference resistor 200. For one example, upon determining the value of identification resistor 186 and thus determining the type of oven accessory 170 connected to port 174, controller 160 determines or retrieves a reference resistance value for reference resistor 200 (e.g., via a look up table), such as:

| Oven Accessory | $R_{reference}$ (Ohms) |
|---|---|
| Meat Probe | 8250 |
| Pizza Stone Probe | 787 |
| Cake Dish Probe | 1210 |
| Casserole Dish Probe | 6490 |
| Coffee Roaster Probe | 3160 |

According to another embodiment, controller 160 includes a look up table directly associating the value of identification resistor 186 to the value of reference resistor 200.

Upon retrieving the appropriate value for the reference resistor 200 (i.e., reference resistor value), processor 152 may adjust the variable resistance module 202. With the properly selected reference resistor value, controller 160 may accurately determine temperature changes (e.g., of a food item or cookware item) via probe 178. For instance, a fluctuation of sensor resistor 184 during a cooking operation may adjust output voltage 204 observed at processor 152 (or within controller 160, or a separate, dedicated controller within oven appliance 100). For one example, a temperature fluctuation reading may be determined according to a set or predetermined equation, such as the equation:

$$V_{out} = V_{in} * \frac{R_{sensor}}{(R_{reference} + R_{sensor})}$$

Thus, output voltage 204 may be compared against a temperature table to determine a temperature of the food item or cookware item. Accordingly, a corresponding temperature table (e.g., temperature look up table) may be retrieved or obtained by controller 160 (e.g., processor 152) after adjusting the variable resistance module 202. Additionally or alternatively, a corresponding equation may be retrieved or obtained. The corresponding equation or temperature table may be associated with the particular reference resistor value. Advantageously, a unique and specific temperature table or equation may be used for (i.e., associated with) each unique oven accessory 170 attached to port 174.

Figure 8:
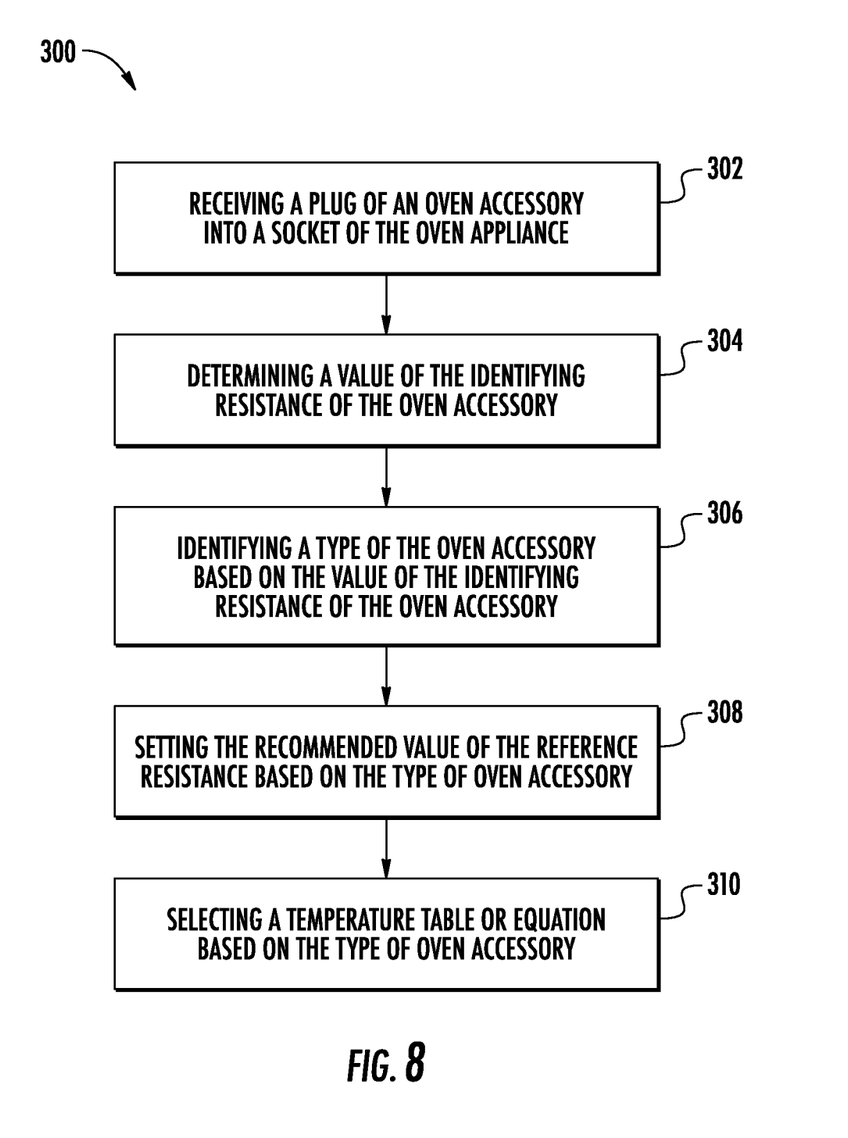
FIG. 8 provides a flow chart illustrating a method of operating an oven appliance according to exemplary embodiments.

Referring now to FIG. 8, an exemplary method 300 of operating an oven appliance (e.g., oven appliance 100) will be described in detail with reference particularly to FIGS. 6 and/or 7. Although the discussion below refers to the exemplary method 300 of operating oven appliance 100, one skilled in the art will appreciate that the exemplary method 300 is applicable to any suitable domestic appliance capable of performing a cooking operation (e.g., such as a cooktop, a griddle, a sous vide cooker, etc.). In exemplary embodiments, the various method steps as disclosed herein may be performed by controller 160 and/or a separate, dedicated controller.

At step 302, method 300 may include inserting (or receiving) a plug of an oven accessory into a socket. For instance, the controller of the appliance may determine that a plug (e.g., plug 172) has been inserted into a socket (e.g., socket 176). According to some embodiments, the appliance (e.g., controller 160 or processor 152) receives a voltage as completed by a circuit of the plug. Additional or alternative means may be used to determine that the plug has been inserted into the socket. For instance, one or more sensors may detect the insertion of the plug (e.g., an optical sensor, a contact sensor, an electrical sensor, etc.), as would be understood.

At step 304, method 300 may include determining a value of an identifying resistance of the oven accessory. As previously discussed above, a first circuit may be completed through the plug, a voltage source, and a controller (e.g., a processor within the controller). After registering the output voltage at the processor, the appliance may extrapolate a value of the identifying resistance (e.g., identification resistor 186). After determining the value of the identifying resistance, method 300 may proceed to step 306.

At step 306, method 300 may include identifying the type of oven accessory based on the value of the identifying resistance. For instance, as mentioned above, the controller may refer to a look up table to associate the determined identifying resistance with a particular oven accessory. According to some embodiments, steps 304 and 306 may be determined according to inputs from a user. For instance, after inserting the plug into the socket, the appliance may provide a prompt to the user to identify the oven accessory. The user may then provide an input (e.g., via a user interface on the appliance) identifying the oven accessory. Accordingly, in some instances, step 304 is omitted, and the identification of the oven accessory type is determined according to the user input.

At step 308, method 300 may include setting the recommended value of the reference resistance based on the type of oven accessory. As described above, the reference resistance value may be adjusted according to the type of oven accessory connected to the appliance. The processor may send a control signal to a variable resistance module (e.g., variable resistance module 202), such as a digital potentiometer, to set a specific resistance value to be utilized during a temperature monitoring operation (e.g., during a cooking operation). The variable resistance module may then set the resistance according to the selected (or determined) oven accessory.

At step 310, method 300 may include selecting a temperature table or equation based on the type of oven accessory. The selected temperature table may be adjusted according to the determined reference resistance value. Thus, during the cooking operation, output voltages as read by the processor may be subject to more finely tuned fluctuations. Advantageously, the electronics (or sensor interface circuit) may be optimized for each unique oven accessory connected thereto. Similarly, conversion equations used to associate the voltage fluctuations with temperature fluctuations may be specific to each individual oven accessory.

According to some embodiments, method 300 may include selecting or recommending a cooking cycle based on the determined oven accessory attached to the appliance. For example, method 300 determines that a sous vide attachment is attached to the port or socket. The appliance may then deduce that a sous vide cooking operation is to be performed and recommend certain heat or power levels to be used. According to another example, method 300 determines that a pizza stone is attached to the port or socket. The appliance may then deduce that a pizza is to be cooked within or on top of the appliance. Specific heating elements may then be activated at recommended temperatures to perform a pizza cooking operation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooking appliance assembly, comprising: a cooking appliance comprising:
    a heat source; and
    a port comprising a socket;
    at least one cooking accessory comprising an accessory sensor, a plug, and at least one resistive element, the plug being removably received within the socket;
    a variable resistance module provided within the cooking appliance and operably connected with the port; and
    a controller comprising at least one processor and at least one memory, the controller communicatively coupled with the cooking appliance and the at least one cooking accessory, the controller configured to perform an operation, the operation comprising:
    determining an accessory type of the cooking accessory with a value of the at least one resistive element, when the plug engaged with the port of the cooking appliance;
    adjusting, via the variable resistance module, a reference resistance at the variable resistance module based on the determined accessory type; and
    selecting a corresponding temperature table or equation based on the determined accessory type of the cooking accessory.

2. The cooking appliance assembly of claim 1, wherein determining the accessory type comprises:
    determining an identification resistance value of the at least one resistive element of the at least one cooking accessory.

3. The cooking appliance assembly of claim 2, wherein determining the identification resistance value comprises:
    receiving, via the controller, an identification output voltage of the at least one cooking accessory through the at least one resistive element, wherein the identification resistance value is based on the identification output voltage.

4. The cooking appliance assembly of claim 1, further comprising:
    a user interface provided on the cooking appliance, and wherein determining the accessory type comprises:
    emitting, via the user interface, a request to identify the accessory type; and
    receiving, via the user interface, a selection identifying the accessory type engaged with the port.

5. The cooking appliance assembly of claim 1, wherein the socket comprises at least one of a tip-ring-ring-sleeve (TRRS) socket or a tip-ring-sleeve (TRS) socket, and wherein the plug comprises a corresponding TRRS or TRS plug configuration.

6. The cooking appliance assembly of claim 1, wherein the at least one resistive element comprises a film resistor.

7. The cooking appliance assembly of claim 1, wherein selecting the corresponding temperature table or equation comprises:
    retrieving a unique temperature table from a plurality of stored temperature tables within the cooking appliance, the unique temperature table being directly associated with the reference resistance.

8. The cooking appliance assembly of claim 1, wherein the operation further comprises:
   selecting a cooking cycle based on the accessory type engaged with the port.

9. The cooking appliance assembly of claim 8, wherein the accessory sensor further comprises at least one temperature sensor for measuring a temperature of an item during the cooking cycle within the cooking appliance.

10. The cooking appliance assembly of claim 1, wherein the variable resistance module is a digital potentiometer.

* * * * *